United States Patent

Gachot et al.

[15] 3,656,813

[45] Apr. 18, 1972

[54] SINGLE-PISTON BRAKE CYLINDER FOR A DOUBLE-CIRCUIT COMPRESSED-AIR BRAKE SYSTEM

[72] Inventors: Jean Gachot, 179 Avenue de la Division Leclerc, Enghien; Fernard Perales, 87 rue A. G. Belin, Argenteuil, both of France

[22] Filed: Mar. 9, 1970

[21] Appl. No.: 17,765

[30] Foreign Application Priority Data

Mar. 19, 1969 France ..................................6907886

[52] U.S. Cl. ..........................................................303/2, 303/9

[51] Int. Cl. ..........................................................B60t 13/36

[58] Field of Search ...........137/112; 92/161; 248/74, 58–59; 303/2, 9, 13

[56] References Cited

UNITED STATES PATENTS

| | | | |
|---|---|---|---|
| 2,240,166 | 4/1941 | Stanley | 303/2 X |
| 2,044,921 | 6/1936 | Swanland | 137/112 |
| 3,015,465 | 1/1962 | Schmitt | 248/74 |
| 3,061,253 | 10/1962 | Keaton | 248/74 |
| 3,376,004 | 4/1968 | Goldman | 248/74 |
| 3,517,901 | 6/1970 | Jenkins | 248/59 |
| 2,041,884 | 5/1936 | Vorech et al. | 303/13 |
| 2,366,608 | 1/1945 | Freeman | 303/2 X |
| 3,309,149 | 3/1967 | Bueler | 303/13 |

*Primary Examiner*—Milton Buchler
*Assistant Examiner*—John J. McLaughlin
*Attorney*—Young & Thompson

[57] ABSTRACT

A single-piston brake cylinder for a double-circuit brake system consisting of a main application circuit and an emergency application circuit. A double check-valve is fixed on the cylinder and has its two admission ports connected respectively to the main circuit and to the emergency circuit whilst the discharge port of said check-valve is adapted to communicate with said cylinder. The flap of the double check-valve cannot become oxidized and impurities are not liable to accumulate in its vicinity since this flap operates continuously under normal service conditions. This ensures safe operation of the emergency circuit.

3 Claims, 8 Drawing Figures

INVENTORS

JEAN GACHOT
FERNAND PERALES
BY Young & Thompson
ATTYS.

INVENTORS

JEAN GACHOT
FERNAND PERALES

BY Young & Thompson
ATTYS.

INVENTORS:

JEAN GACHOT
FERNAND PERALES
BY Young + Thompson
ATTYS.

INVENTORS

JEAN GACHOT

FERNAND PERALES

BY Young + Thompson

ATTYS.

SINGLE-PISTON BRAKE CYLINDER FOR A DOUBLE-CIRCUIT COMPRESSED-AIR BRAKE SYSTEM

This invention relates to a single-piston brake cylinder for a compressed-air brake system of the double circuit type, especially for motor vehicles.

A double circuit is understood to designate a main brake-application circuit and an emergency brake-application circuit, these circuits being connected on the one hand through a brake valve to two separate compressed-air reservoirs which are fed by a compressor and on the other hand to the brake cylinders of the different sets of wheels and especially the rear wheels of a vehicle.

In the double-circuit brake systems which are usually employed, the brake cylinders have steel walls and comprise a double or telescopic piston, both pistons being connected respectively to the main application circuit and to the emergency application circuit. These brake cylinders entail complicated manufacture and high production costs. In addition, the internal cylinder walls are liable to become oxidized.

A double-circuit brake system of a different type which has also been described in the literature comprises single-piston brake cylinders and a double check-valve of the piston type which is separate from the brake cylinder and serves to connect this latter selectively either to the main application circuit or to the emergency application circuit. Since the emergency circuit is employed only under exceptional circumstances, the valve piston remains stationary in the same position over long periods of time and is liable to become jammed as a result of oxidation of the wall or deposition of impurities. Serious accidents are liable to occur under such conditions unless steps are taken to check the operation of the emergency circuit periodically.

The primary aim of this invention is to overcome the disadvantages referred-to above by making it possible to employ in a double-circuit brake system a single-piston cylinder which ensures complete operational safety and reliability.

In accordance with the invention, the single-piston brake cylinder for a double-circuit brake system consisting of a main application circuit and an emergency application circuit essentially comprises a double check-valve which is fixed on the brake cylinder and the two admission ports of which are connected respectively to the main circuit and to the emergency circuit whilst the discharge port of said valve is adapted to communicate with the cylinder.

By "double check-valve" is meant a valve having two admission ports and one discharge port, said valve being designed to permit the flow of air from either of the two admission ports towards the discharge port without providing for any communication between the two admission ports.

In a preferred embodiment of the invention, the double check-valve is of the pivotal flap type described in U.S. Pat. No. 3,610,698.

The system which is thus provided is compact, inexpensive to produce and achieves a high standard of operational reliability.

Further properties of the invention will appear from the detailed description which now follows below, reference being made to the accompanying drawings which are given by way of example without any limitation being implied and in which.

Figure 1:
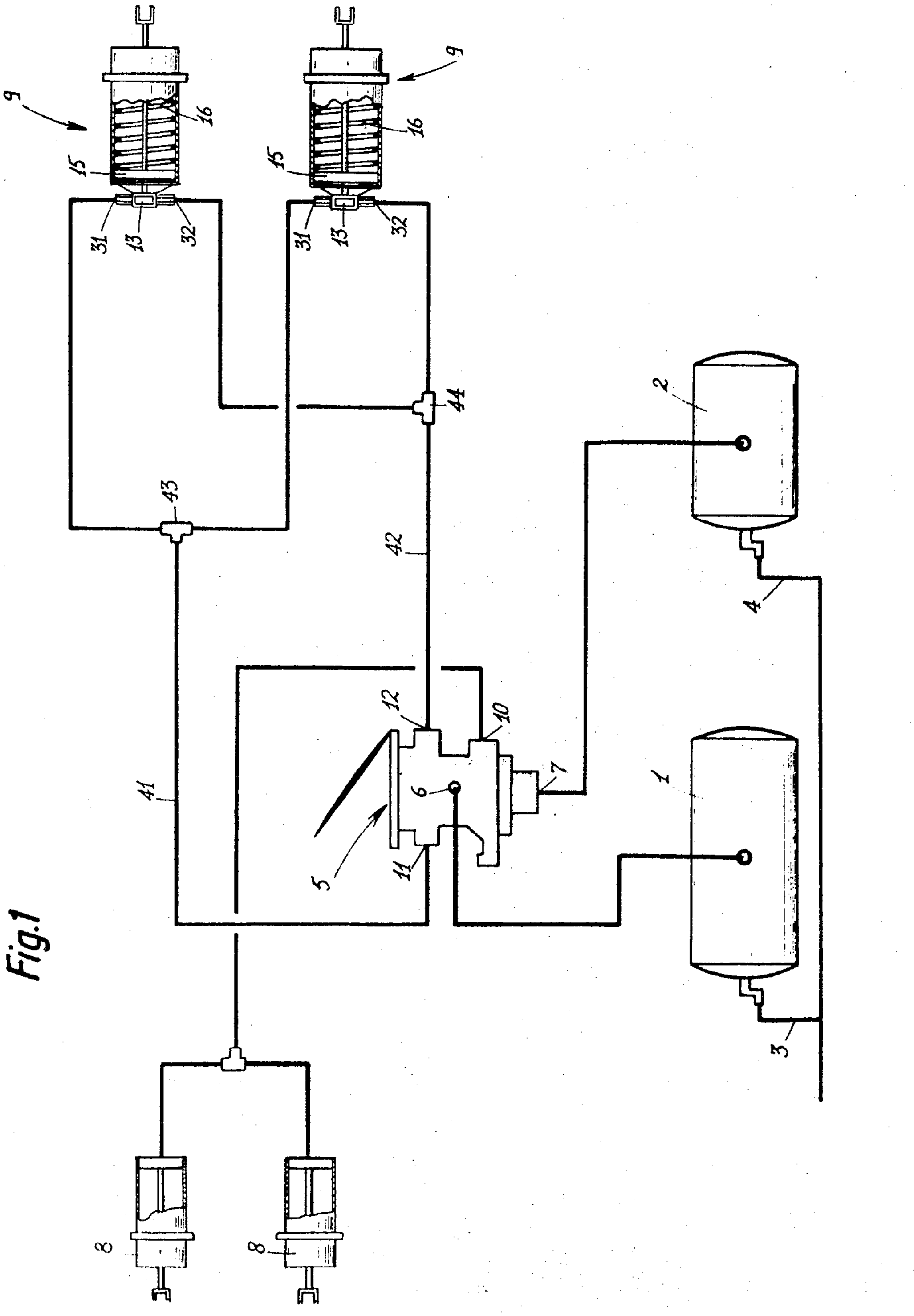
FIG. 1 is a diagram of a first embodiment of a double-circuit brake system comprising brake cylinders in accordance with the invention.

As shown in FIG. 1, the double-circuit brake system of a vehicle comprises two compressed air reservoirs 1 and 2 which are supplied from a compressor (not shown) via pipes 3 and 4 and which are connected to the admission openings 6 and 7 of a brake-actuating unit 5.

The actuating unit 5 is of the type described in U.S. Pat. No. 3,503,651. Said unit 5 has a discharge opening 10 which is connected to the inlets of the front-wheel brake cylinders 8, a discharge opening 11 which controls the main circuit 41 for normal-service brake-application at the rear wheels and a discharge opening 12 which controls the circuit 42 for emergency brake-application at the rear wheels.

The rear-wheel brake cylinders 9 have a main inlet 31 and an emergency inlet 32. The main inlets 31 are connected in parallel to the main circuit 41 by means of a T-junction 43 and the emergency inlets 32 are connected in parallel to the emergency circuit 42 by means of a T-junction 44.

The operation of the system was described in the above-cited U.S. Pat. No. 3,503,651. Under normal-service conditions, the operation of a foot pedal for controlling the brake-actuating unit 5 has the effect of transmitting the pressure of the reservoir 1 to the main circuit 41 and initiates application of the rear brakes. Moreover, the pressure of the reservoir 2 is applied to the front cylinders 8. In the event of failure of the main circuit 41 or of the reservoir 1, the brake-actuating unit 5 applies the pressure of the reservoir 2 simultaneously to the front cylinders and to the emergency circuit 42 of the rear brakes.

Figure 2:
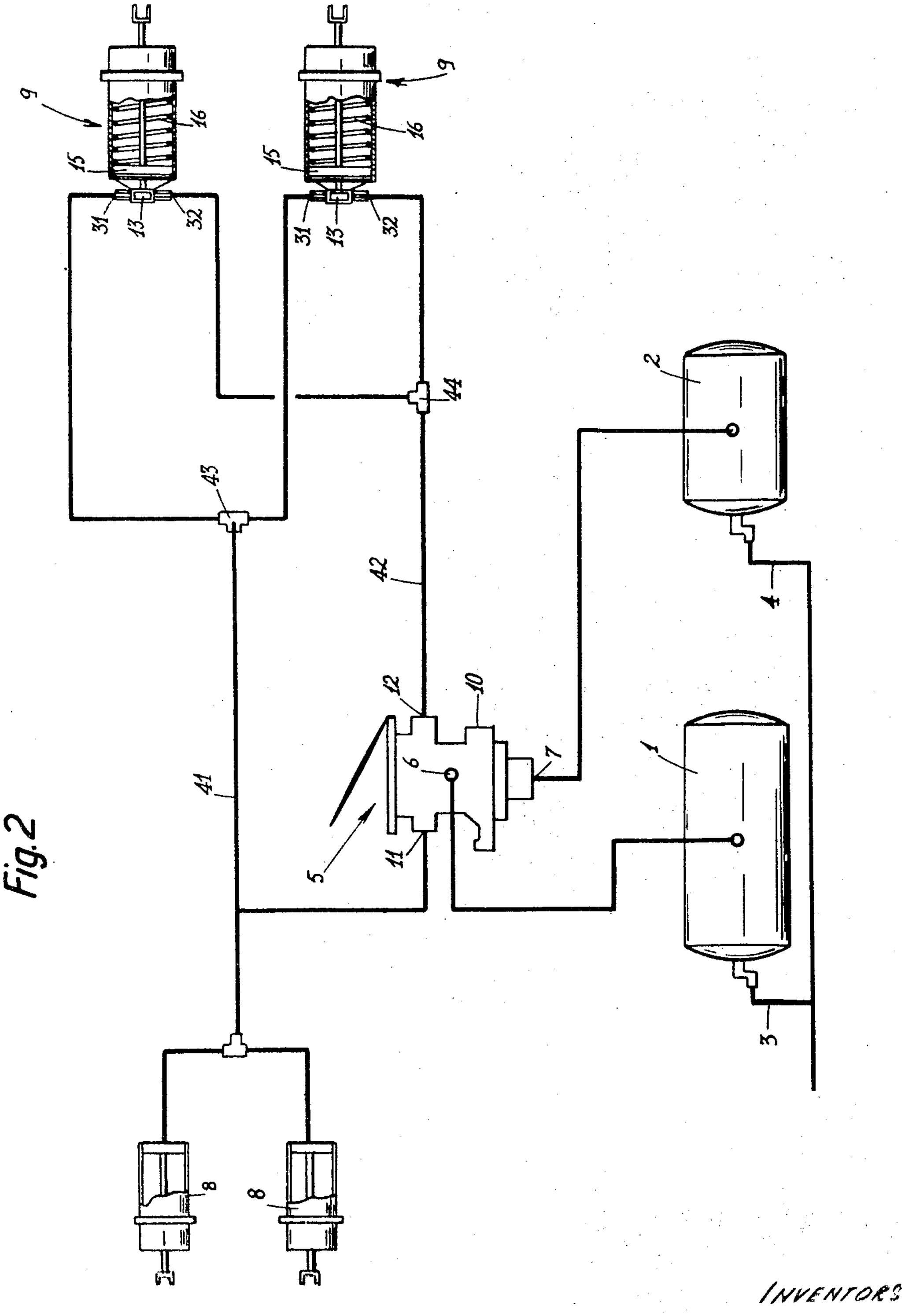
FIG. 2 is a diagram of a second embodiment of a double-circuit brake system comprising brake cylinders in accordance with the invention.

In the diagram of FIG. 2, the front cylinders 8 are supplied by the main circuit 41 and the discharge opening 10 of the brake-actuating unit 5 is not employed. The reservoir 2 is in that case employed only for emergency brake application.

Figure 3:
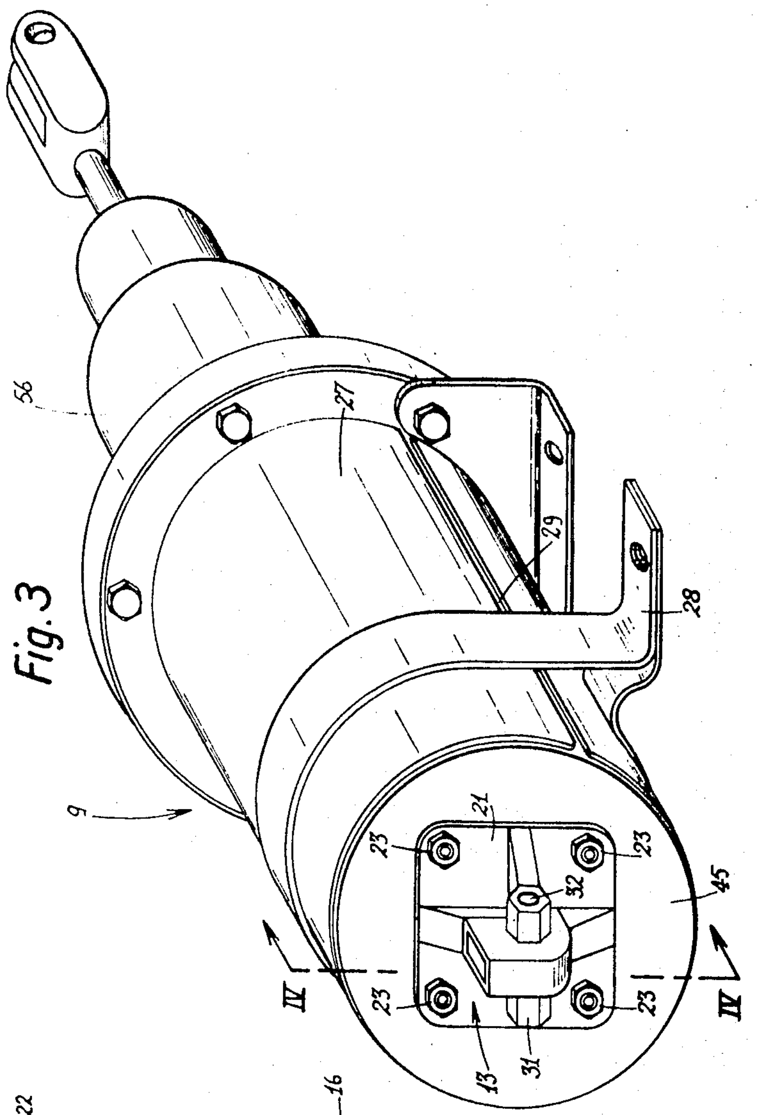
FIG. 3 is a perspective view of the brake cylinder in accordance with the invention.
Figure 4:
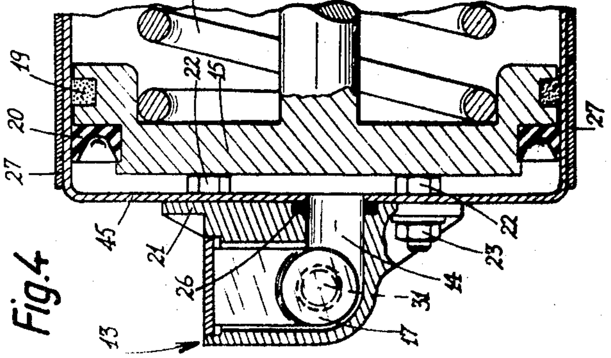
FIG. 4 is a fragmentary axial sectional view taken along line IV—IV of FIG. 3.

For the purpose of brake application at the rear wheels, it is intended in accordance with the invention to employ cylinders 9 in which a single piston 15 is subjected to the action of a restoring spring 16. As shown in FIG. 4, the piston is provided in a manner known per se with a lubricating felt ring 19 and with a front packing ring 20. The walls of the cylinders 9 are of stainless steel and the side wall is protected externally against impacts by means and the side wall is protected externally against impacts by means of a sleeve consisting of a steel cylinder 27 (as shown in FIG. 3) having a longitudinal slit 29. The sleeve 27 is clamped by means of a strap 28 which serves to fix the brake cylinder on the vehicle.

Figure 5:
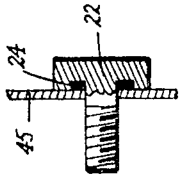
FIG. 5 is an enlarged view of a detail of FIG. 4.

Provision is also made in accordance with the invention for a double-check valve 13 which is incorporated with the brake cylinder 9. In the embodiment which is illustrated in FIGS. 3 to 6, said check-valve is of the pivotal flap type as described in U.S. Pat. No. 3,610,698. The valve 13 is provided with an end plate 21 which is secured to the end wall 45 of the cylinder 9 by means of bolts 22 and nuts 23. The heads of the bolts 22 are located inside the cylinder 9 and serve as end-of-travel stops for the piston 15. Said bolt heads are each provided with an annular groove in which is fitted a seal 24, as shown in FIG. 5.

The double check-valve 13 is provided in a manner which is known per se with two admission ports 31 and 32 which constitute respectively the main inlet and emergency inlet of the cylinder 9 and with a discharge port 14 which opens into the interior of the cylinder 9 with interposition of an annular seal 26. The closure member of the valve consists of a pivot flap 17 as described in U.S. Pat. application No. 823,296 filed May 5, 1969.

U.S. Pat. No. 3,610,698. As described in that patent the pressure applied by the main circuit 41 at the admission port 31 under normal-service conditions has the effect of applying the flap 17 against the second admission opening 32, with the result that the compressed air is admitted into the cylinder 9. Conversely, under conditions of emergency brake-application, air flows from the emergency circuit 42 to the cylinder 9 via the admission opening 32, the main admission opening 31 being accordingly sealed off by the flap 17.

Figure 6:
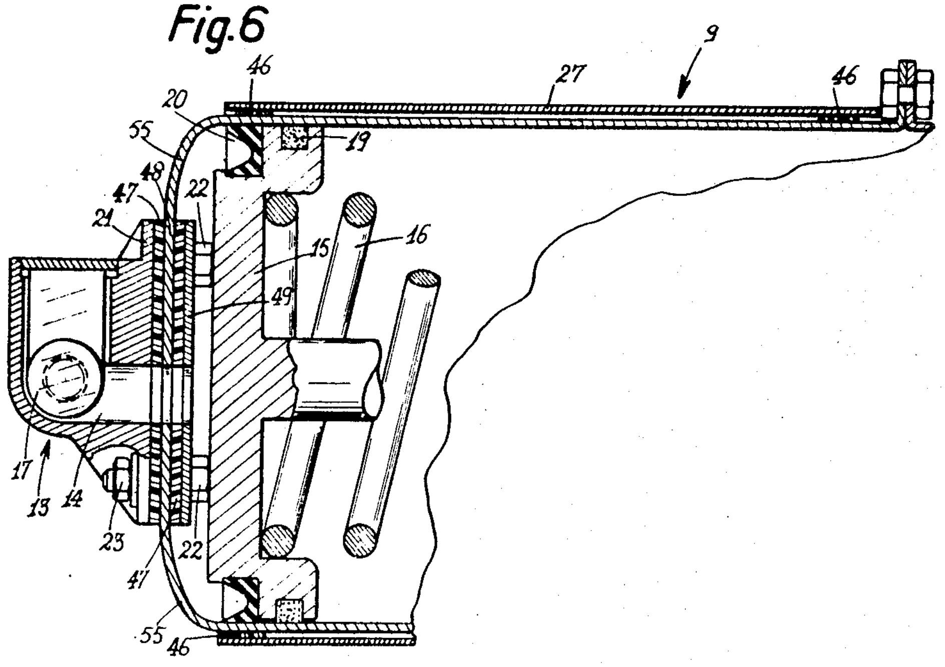
FIG. 6 is a view which is similar to FIG. 4 and shows an alternative form of construction of the brake cylinder of FIG. 3.
Figure 8:
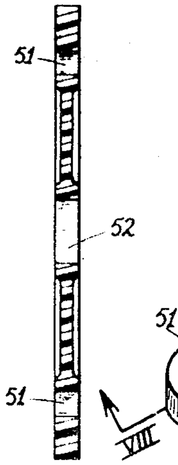
FIG. 8 is a sectional view of the gasket, this view being taken along line VIII—VIII of FIG. 7.
Figure 7:
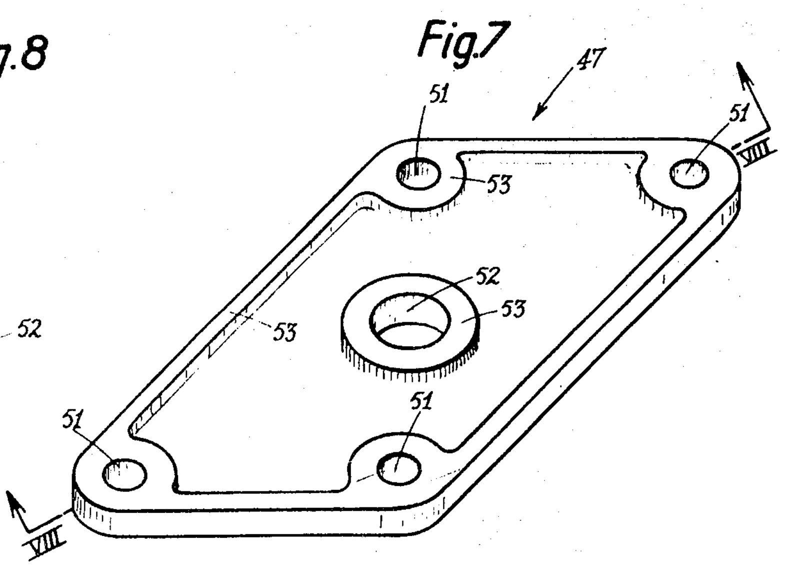
FIG. 7 is a perspective view of a gasket which is employed in the alternative form of construction of FIG. 6.

There is illustrated in FIGS. 6 to 8 a preferred embodiment of the invention in which elastic packing rings 46 are interposed between the steel sleeve 27 and the stainless steel side wall of the cylinder 9. In addition, the individual seals 24 and 26 are replaced by two rectangular gaskets 47 which are placed on each side of the end wall 48 of the cylinder and clamped between the end plate 21 of the valve and a small metallic plate 49.

As shown in FIGS. 7 and 8, the gaskets 47 are pierced by holes 51 for the insertion of fastening bolts 22 and by a central hole 52 for connecting the discharge port 14 of the valve 13 to the interior of the cylinder 9. A peripheral overthickness 53 is formed around the holes 51 and 52 of said gaskets in order that the pressure which has the effect of flattening the seals should be applied directly in the vicinity of said holes.

This type of seal facilitates the assembly of the valve 13 and makes it possible in particular to employ automatic machines for screwing all the bolts 22 in position at the same time.

Furthermore, the end wall of the cylinder 9 is provided with a flat central portion 38 which supports the valve 13 and with a convex annular portion 55 which is joined to the side wall of the cylinder. This end-profile endows the cylinder with appreciably enhanced resistance to the internal pressure of compressed air by virtue of the fact that there are no sharp edges or corners.

The cylinder 9 can also comprise a device 56 (FIG. 3) for locking the brakes in the stationary position, said device being preferably of the type which provides positive double control by compressed air as described in U.S. Pat. No. 3,597,016.

By "positive double control device" is understood to mean a device in which both locking and unlocking are controlled by the delivery of compressed air.

The brake cylinder in accordance with the invention permits the use of a single-piston cylinder in a double-circuit brake system, is of rugged construction and entails low capital cost. The brake cylinder has corrosion-resistant walls of stainless steel and is very effectively protected against impacts by the sleeve 27 and the elastic packing rings 46. The internal walls are subject to very low wear.

The double check-valve is inexpensive to construct and provides a very high degree of operational safety. In fact, the flap 17 cannot become oxidized and since this latter operates continuously under normal service conditions, deposits consisting of impurities are not liable to accumulate in the vicinity of the flap. Operation of the emergency circuit is thus ensured.

Attachment of the valve 13 to the end wall of the cylinder by means of bolts makes it possible to inspect or replace the valve without difficulty. Moreover, this method of attachment avoids weak points which, in brake cylinders of known types, result in deformations in the vicinity of welded joints formed at the cylinder inlets.

It is to be understood that the invention is not limited to the embodiments which have been described in the foregoing and any alternative form of execution within the capacity of those skilled in the art may be contemplated without thereby departing either from the scope or the spirit of this invention.

What we claim is:

1. A single-piston brake cylinder for a dual-circuit brake system comprising a main and an emergency brake circuit and a double check valve having a valve body, a chamber formed in said valve body, two inlet ports connected respectively to said main and emergency circuits and an outlet port adapted to communicate with said cylinder, wherein said double check valve is removably mounted on a wall of said cylinder and comprises flat valve seats defined within said chamber, and entirely encompassing each of said inlet ports, which are substantially axially aligned, and a flexible flap pivotally mounted within said chamber between said valve seats and having flat opposite faces each of which can contact a said flat valve seat entirely about a said inlet port thereby selectively to obturate one of said inlet ports under the action of fluid under pressure supplied through the other inlet port said flap extending in a direction substantially perpendicular to the axis of said inlet ports and having one end inserted in said valve body, said opposite faces of said flap being disposed at an acute angle to each other, whose apex is remote from said inserted end of said flap, said flap tapering in thickness over all the portion of the flap that contacts said valve seats.

2. A brake cylinder according to claim 1, wherein the double check valve is carried by a support which is in turn attached to said wall of the cylinder by means of bolts whose extremities are adapted to serve as stops for the piston in said brake cylinder.

3. A brake cylinder according to claim 1, wherein the end wall of the cylinder which carries the double check-valve has a convex peripheral portion which is joined to the side wall of said cylinder.

* * * * *